May 31, 1955 A. S. GOLDSMITH 2,709,748
RADIO DETECTOR APPARATUS
Filed Aug. 16, 1952
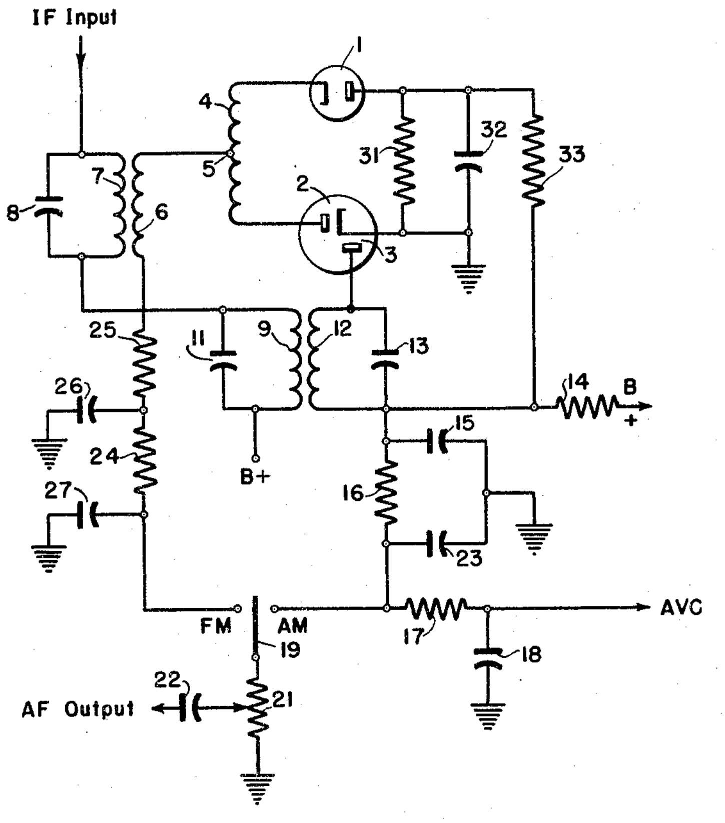
WITNESSES:
John E. Heasley
R. G. Brodahl
INVENTOR
Alan S. Goldsmith
BY
F. E. Browder
ATTORNEY United States Patent Office 2,709,748

Patented May 31, 1955

2,709,748

RADIO DETECTOR APPARATUS

Alan S. Goldsmith, Sunbury, Pa., assignor to Westinghouse Electric Corporation, East Pittsburgh, Pa., a corporation of Pennsylvania Application August 16, 1952, Serial No. 304,731

7 Claims. (Cl. 250—27)

My invention relates to radio receivers and in particular relates to radio receivers which are designed to be used alternately on amplitude modulation (hereafter called AM) signals and on frequency modulation (hereafter called FM) signals. In such dual purpose receivers, it is desirable to be able to change from one type of operation to the other by very simple adjustment and, since they are sold in a highly competitive market, to employ the minimum number of different receiver tubes in their circuits. More specifically stated, my invention comprises a receiving circuit embodying three diodes which may be used to demodulate FM signals together with delayed automatic volume control (hereafter called AVC), and which, by simple alteration of the circuit connections by a single switch, may use one of the three tubes for demodulation of AM signals.

In accordance with the prior art with which I am acquainted, FM programs have been demodulated by employing a pair of diodes, and delayed AVC has been produced by a third diode. If the same receiver was adapted for demodulation of AM programs, a fourth diode had to be provided, together with appropriate switching devices to effect the changeover. I have, however, evolved a circuit by which the use of a fourth diode is avoided in rereceivers to perform the above-described functions and operations, while at the same time the number of circuit changes and switching is reduced to the simple operation of a single pole two-way switch.

One object of my invention is accordingly to provide a new and improved circuit for FM–AM radio receivers.

Another object is to provide a novel network for performing the functions of demodulation and delayed AVC for FM programs and for performing the function of demodulation with undelayed AVC on AM programs.

Another object is to provide a circuit network by which it is possible to demodulate FM transmissions and effect delayed AVC by means of three diodes, and to very simply reconnect the circuit network to effect demodulation and AVC by using one of the three diodes.

Still another object of my invention is to provide a circuit network for combined FM and AM radio receivers in which demodulation and delayed automatic volume control circuits employing three diodes may be altered into a network for effecting demodulation and undelayed automatic volume control of AM signals by means of a simple double-throw single-pole switch.

Other objects of my invention will become apparent upon reading the following description taken in connection with the drawing in which the single figure is a schematic diagram of th demodulation and automatic volume control portions of a combined FM and AM receiver circuit.

Referring in detail to the drawing, a diode 1 comprises an anode and a heated cathode while a second diode 2 comprises an anode and cathode. The cathode last mentioned together with an ancillary anode may constitute a third diode 3. The cathode of diode 1 and the anode of diode 2 are interconnected by a winding 4 having a midtap 5 to which is connected one terminal of a second winding 6 which is in good inductive relation with a primary winding 7 shunted by a capacitor 8. One terminal of the winding 7 is connected to the intermediate frequency amplifier of a radio receiver while the other terminal of the winding 7 is connected to one terminal of a primary winding 9 shunted by a capacitor 11 to form the tuned primary of a radio frequency transformer. The other end of the winding 9 may be connected to the positive pole B+ of a direct current source (not shown) which supplies current to the above-mentioned intermeiate frequency amplifier. An intermediate frequency input (IF input) thus is supplied to the windings 7 and 9.

In good inductive relation with the primary winding 9 is a secondary winding 12 shunted by a capacitor 13 to form a tuned anti-resonant circuit connected at one side to the anode of the diode 3 and connected at its other side through a resistor 14 to the positive terminal B+ of a direct current source (not shown) having its negative terminal grounded. The common terminal of the capacitor 13 and the resistor 14 is likewise connected to ground through a capacitor 15 and it also is connected through a resistor 16 and another resistor 17 to the AVC lead of the radio receiver which latter is connected to ground through a capacitor 18 as is conventional in the art.

The common terminal of the resistors 16 and 17 is connected to one of the unhinged terminals of a single pole double throw switch 19 having its hinged terminal connected to ground through a potentiometer 21. The audio amplifier of the receiver is connected through a capacitor 22 to a movable tap on the potentiometer 21. A capacitor 23 connects the common terminal of resistors 16 and 17 to ground. The other unhinged terminal of the switch 19 is connected through two resistors 24, 25 to the free terminal of the secondary winding 6. Capacitors 26, 27 connect the opposite terminals of the resistor 24 to ground forming a well-known type of filter.

The anode of the diode 1 is connected to the grounded cathode of the diodes 2 and 3 by a resistor 31 which is shunted by a capacitor 32, and is also connected through a resistor 33 to the common terminal of the capacitor 13 and the resistor 14. When it is desired to operate the receiving set on AM broadcasts, the blade of switch 19 is thrown into contact with its right hand terminal to connect the common terminal of resistors 16 and 17 to ground through the potentiometer 21. The primary winding 9 and capacitor 11 are proportioned so as to resonate to the intermediate frequency of the incoming AM signals, the winding 7 and capacitor 8 being tuned to resonate only at the intermediate center frequency of the FM signals. When the blade of switch 19 is thrown in the direction just described, the AM signals will impress a voltage across the diode 3 in series with the resistor 16 and potentiometer 21 to ground thus forming a conventional AM diode detector of well-known type yielding the audio frequency output or program through the capacitor 22 to the audio frequency amplifier of the receiver and producing an AVC voltage through resistor 17 at the capacitor 18. This arrangement will be seen to give an undelayed AVC output of well known form. The voltage impressed by the winding 7 through secondary winding 6 is negligibly small and since the left hand terminal of switch 19 is floating free, winding 6 will produce no substantial voltage at the terminals of diodes 1 and 2 and no substantial voltage on resistor 31 and capacitor 32. The diode 3 will produce a direct current flow through resistors 33 and 31 to ground, this path being in parallel with the path through resistor 16 and potentiometer 21 to ground. However, the resistance of the resistor 33 is made large compared with the combined resistance of resistor 16 and potentiometer 21 so that the current bypassed by resistor 33 from potentiometer 21 is negligibly small.

Since the network 9, 11 is tuned to the intermediate frequency of the AM signal, it will induce a substantial voltage in secondary winding 12 and the shunting capacitor 13 tuned thereto and the diode 3 will rectify the AM signal in a conventional way to deliver demodulated signals to the audio amplifier and the AVC.

When it is desired to operate the receiver on FM transmission, the blade of switch 19 is thrown to its left hand terminal thereby connecting the secondary winding 6, winding 4 and diodes 1 and 2, resistor 31, capacitor 32, potentiometer 21 and resistors 24 and 25 into a network forming a well known FM discriminator. Since the resonant circuit 7, 8 is tuned to the FM intermediate frequency, voltage induced in the secondary winding 6 and applied to this discriminator circuit is of substantial magnitudes whereas the voltage impressed by the detuned capacitor 13 is negligibly small. The potentiometer 21 will then impress the demodulated FM signal through capacitor 22 on the audio frequency amplifier, while the resistor 17 and capacitor 18 will operate the automatic volume control.

Current will flow from the associated positive terminal B through resistor 14, resistor 33 and resistor 31 to ground thereby impressing a positive voltage from the common terminal of resistor 14 and 33 through the secondary winding 12 on the anode of diode 3. The values of the resistors 14, 33 and 31 are made such that if a conventional voltage like 100 volts is applied at the terminal B, the voltage which would appear if diode 3 were non-conducting between the anode of diode 3 and its grounded cathode is of the value desired for the delay in automatic volume control; for example, this may be 6 volts. It will be seen that the diodes 1 and 2 are so poled as to make the common terminal of resistors 31 and 33 negative relative to ground when an FM signal is energizing these diodes. When the strength of the FM signal is so slight that the voltage drop through resistor 31 due to the FM signal is negligibly small, the current flow from source B to ground through resistor 33 will tend to make the anode of diode 3 positive to ground. Diode 3 will accordingly divert current from resistor 33 until the common terminal of resistors 14 and 33 is substantially at ground potential. The common terminal of resistor 17 and capacitor 18 will assume this same potential since there is no current flowing from any source through resistor 16 in view of the open condition of the blade of switch 19. The AVC lead will accordingly be reduced to practically ground potential and no automatic volume control will be produced on the receiver amplifiers.

As the FM signal increases the potential of the anode of diode 1 becomes increasingly negative and the current through resistor 14 will increase, thereby increasing the potential drop across it. When this potential drop exceeds the value of the B voltage, the potential of the anode of diode 3 will become negative with respect to ground and the diode will cease to conduct. The AVC voltage will then follow any increase in negative potential across the diode due to increasing potential drop across resistor 14. Hence the diode 3 and the remainder of the drawings act to produce a delayed automatic volume control for the receiver amplifiers. On the other hand, it will be noted that when an AM signal is coming in to the receiver, the AVC voltage impressed on the receiver amplifiers is subject to no such delay.

I claim as my invention:

1. In a frequency modulation-amplitude modulation signal receiver, a frequency demodulator having a frequency modulation output impedance which has one terminal connected to the cathode of a diode, a source of amplitude modulated signal voltage serially connected with the anode to cathode path through said diode, an audio output impedance, connections for an automatic volume control circuit shunting said serial connection of said source and said diode, a source of frequency modulated signal voltage energizing said frequency demodulator, means comprising a delay-control resistor connected between the other terminal of said frequency modulation output impedance and said anode, means to cause said delay-control resistor to be traversed by direct current which is substantially invariable in value, and means to switch said audio output impedance either to shunt said connections or to be traversed by the output current of said frequency demodulator.

2. In a frequency modulation-amplitude modulation signal receiver, a frequency demodulator having a frequency modulation output impedance which has one terminal connected to the cathode of a diode, a source of amplitude modulated signal voltage serially connected with the anode to cathode path through said diode, an audio output impedance, connections for an automatic volume control circuit shunting said serial connection of said source and said diode, a source of frequency modulated signal voltage energizing said frequency demodulator, means comprising a delay-control resistor connected between the other terminal of said frequency modulation output impedance and said anode, means to cause said delay-control resistor to be traversed by direct current which is substantially invariable in value, and means to switch said audio output impedance either to shunt said connections or to be traversed by the output current of said frequency demodulator, the resistance of said delay-control resistor being large compared with the resistance of said audio output impedance.

3. In a frequency modulation-amplitude modulation signal receiver, a frequency demodulator having a frequency modulation output impedance which has one terminal connected to the cathode of a diode, a source of amplitude modulated signal voltage serially connected with the anode-to-cathode path through said diode, an audio output impedance, connections for an automatic volume control circuit shunting said serial connection of said source and said diode, a capacitance in shunt with said connections, a source of frequency modulated signal voltage energizing said frequency demodulator, means comprising a delay-control resistor connected between the other terminal of said frequency modulation output impedance and said anode, means to cause said delay-control resistor to be traversed by direct current which is substantially invariable in value, and means to switch said audio output impedance either to shunt said connections or to be traversed by the output current of said frequency demodulator.

4. In a frequency modulation-amplitude modulation signal receiver, a frequency discriminator having a frequency modulation output resistor, an amplitude modulation detector embodying a diode with its cathode connected to one end of said frequency modulation output resistor and its anode connected to its cathode through a source of amplitude modulated signals and a bypass capacitance, a serial resistor and capacitor in shunt with said bypass capacitance, means comprising a delay-control resistor connecting the anode of said diode to the other end of said frequency modulation output resistor, means to cause a substantially invariable direct current to traverse said delay-control resistor, an audio-output resistor, means to connect it at will between said cathode and either an intermediate point on said serial resistor or a terminal on the alternating current input channel of said frequency discriminator, and an automatic volume control circuit connected to said serial resistor and capacitor.

5. In a frequency modulation-amplitude modulation signal receiver, a frequency discriminator having a frequency modulation output resistor, an amplitude and detector embodying a diode with its cathode connected to one end of said frequency modulation output resistor and its anode connected to its cathode through a source of amplitude modulation signals and a bypass capacitance, a serial resistor and capacitor in shunt with said bypass capacitance, means comprising a delay-control resistor connecting the anode of said diode to the other end of said frequency modulation output resistor, means to cause a substantially invariable direct current to traverse said delay-control resistor, an audio-output resistor, means to connect it at will between said cathode and either an intermediate point on said serial resistor or a terminal on the alternating current input channel of said frequency discriminator, and an automatic volume control circuit connected to said serial resistor and capacitor, the resistance of said delay-control resistor being large compared with the resistance of said audio output impedance.

6. In a frequency modulation-amplitude modulation signal receiver, a freqeuncy discriminator having a T-connected alternating current input winding one terminal of which is connected to the cathode of a first diode and another terminal of which is connected to the anode of a second diode, a resistor shunted by a capacitor connecting the anode of said first diode to the cathode of said second diode, a third diode having its cathode connected to that of said second diode and its anode connected to one terminal of an amplitude modulated signal winding which is shunted by a capacitance, a bypass capacitance connected between the cathode of said third diode and the other terminal of said amplitude-modulated signal winding, a serial resistor and capacitor shunting said bypass capacitance, an atuomatic volume control circuit deriving voltage from said serial resistor and capacitor, means comprising a delay-control resistor connecting the anode of said third diode to the anode of said first diode, means to cause substantially invariable direct current to traverse said delay control resistor, an audio-output resistor, and means to connect it at will either between an intermediate point on said serial resistor and the cathode of said third diode or between the third terminal of said input winding and the cathode of said third diode.

7. In a frequency modulation-amplitude modulation signal receiver, a frequency discriminator having a T-connected alternating current input winding one terminal of which is connected to the cathode of a first diode and another terminal of which is connected to the anode of a second diode, a resistor shunted by a capacitor connecting the anode of said first diode to the cathode of said second diode, a third diode having its cathode connected to that of said second diode and its anode connected to one terminal of an amplitude modulated signal winding which is shunted by a capacitance, a bypass capacitance connected between the cathode of said third diode and the other terminal of said amplitude modulated signal winding, a serial resistor and capacitor shunting said bypass capacitance, an automatic volume control circuit deriving voltage from said serial resistor and capacitor, means comprising a delay-control resistor connecting the anode of said third diode to the anode of said first diode, means to cause substantially invariable direct current to traverse said delay control resistor, an audio-output resistor, and means to connect it at will either between an intermediate point on said serial resistor and the cathode of said third diode or between the third terminal of said input winding and the cathode of said third diode.

References Cited in the file of this patent

UNITED STATES PATENTS

| | | |
|---|---|---|
| 2,472,301 | Koch | June 7, 1949 |
| 2,491,809 | Flyer | Dec. 20, 1949 |
| 2,561,088 | Anderson | July 17, 1951 |